United States Patent [19]

Wang

[11] Patent Number: 4,521,909

[45] Date of Patent: Jun. 4, 1985

[54] DUAL LEVEL PATTERN RECOGNITION SYSTEM

[75] Inventor: Patrick S. Wang, Lexington, Mass.

[73] Assignee: Wang Laboratories, Inc., Lowell, Mass.

[21] Appl. No.: 538,858

[22] Filed: Oct. 4, 1983

[51] Int. Cl.³ .............................................. G06K 9/70
[52] U.S. Cl. ...................................... 382/38; 382/14; 382/34
[58] Field of Search .................... 382/14, 15, 34, 37, 382/38; 358/101, 107; 364/513; 356/388, 394

[56] References Cited

U.S. PATENT DOCUMENTS

| | | | |
|---|---|---|---|
| 3,182,290 | 5/1965 | Rabinow | 382/38 |
| 3,829,831 | 8/1974 | Yamamoto et al. | 382/38 |
| 3,967,241 | 6/1976 | Kawa | 382/38 |
| 4,027,284 | 5/1977 | Hoshino et al. | 382/30 |

OTHER PUBLICATIONS

Yamamoto et al., "Chinese Char. Rec. by Hierarchical Pattern Matching", Proc. of the 1st Int. Conf. on Pattern Rec., Oct. 1973, pp. 187–196.

Primary Examiner—Leo H. Boudreau
Attorney, Agent, or Firm—Michael H. Shanahan; Kenneth L. Milik

[57] ABSTRACT

A pattern recognition system has both coarse and fine levels of analysis in which a coarse array representation of a workpiece pattern is formed and used to identify the workpiece pattern as either a referench character or as a member of an ambiguous set of reference characters which are represented by identical coarse array representations. At least portions of a fine array representation of a workpiece pattern which has been classified as a member of a set of reference characters are compared to corresponding portions of fine array representations of reference characters in the set identified by the classification. The pattern recognition system has a learning system through which reference characters may be introduced into the recognition system and through which a representation of a workpiece pattern which was not identified may be incorporated into an existing set of reference characters of the recognition system.

2 Claims, 14 Drawing Figures

ONE OF 12 LEARNING
MATRICES

FIG 11

| D | | | K | | | H |
|---|---|---|---|---|---|---|
| CH1 | max $M_D(1)$ | | max $M_K(1)$ | | | |
| CH2 | max $M_D(2)$ | | | | | |
| | | | | | | |
| CHi | | | max $M_K(i)$ | | | |
| | | | | | | |
| CHn | max $M_0(n)$ | | max $M_K(n)$ | | | max $M_{11}(n)$ |

FOR GENERATION OF D2 - (K1, K2 CHOSEN FROM EACH ROW OF MATRIX 2)

a) ON THE DIGITIZING GRID b) FINE ARRAY c) COARSE ARRAY

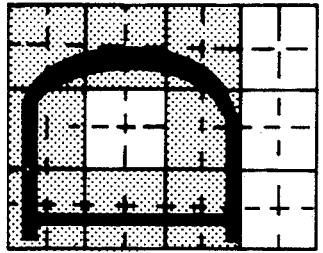
FIG 13
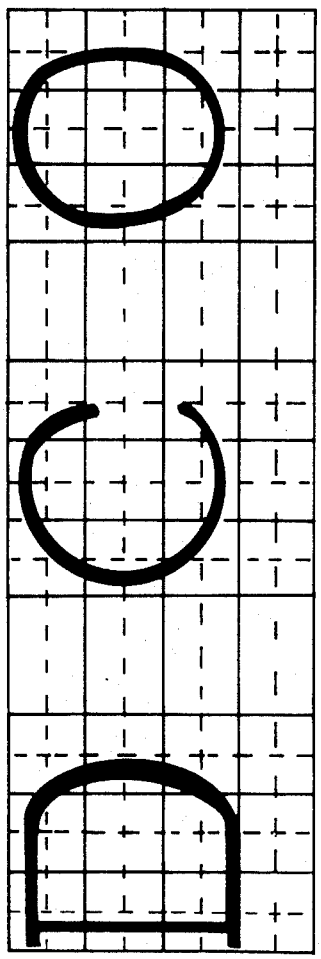

DUAL LEVEL PATTERN RECOGNITION SYSTEM

BACKGROUND OF THE INVENTION

This invention relates to identifying patterns as corresponding to one of a set of reference characters.

A number of pattern recognition systems have been devised in which both coarse and fine analyses have been made of a workpiece pattern. One patent, Yamamoto et al. (U.S. Pat. No. 3,829,831), discloses a system in which a workpiece pattern is converted into a signal derived from a coarse array representation of the workpiece pattern, and classified by comparing the signal to a set of pattern-classifying signals. The workpiece pattern is then identified by comparing a signal derived from a fine array representation of the workpiece pattern to a set of reference signals derived from fine array representations of reference characters selected in the classification analysis.

SUMMARY OF THE INVENTION

In general, the invention features a pattern recognition system having both coarse and fine levels of analysis in which a coarse array representation of a workpiece pattern is formed and used to identify the workpiece pattern as either a reference character or as a member of an ambiguous set of reference characters which are represented by identical coarse array representations. At least portions of a fine array representation of a workpiece pattern which has been classified as a member of a set of reference characters are compared to corresponding portions of fine array representations of reference characters in the set identified by the classification. A workpiece pattern which is not identified as a reference character during a first coarse and fine array analyses is re-encoded into coarse and fine array representations and analyzed again. The pattern recognition system has a learning system through which reference characters may be introduced into the recognition system and through which a representation of a workpiece pattern which was not identified may be incorporated into an existing set of reference characters of the recognition system.

The coarse array representation of a reference character may, according to the invention, operate as an address to an entry in a first database. Each first database entry contains a multiplicity field giving the number of reference characters in the set represented by the coarse array representation. Each first database entry contains a second field giving a code for a reference character having an unambiguous coarse array value or an address to an entry in a second database for a pattern having an ambiguous coarse array value. There is a second database entry for every reference character which is not unambiguously defined by a coarse array representation. Each second database entry contains an identifying code for its reference character and at least portions of the fine array representation of the reference character for use in resolving ambiguities between the reference character and the other reference characters represented by the same coarse array. Second database entries for each reference character represented by identical coarse arrays are grouped together sequentially within the second database.

Also according to the invention, the pattern learning system may accept a workpiece pattern as a new reference character by comparing the coarse array representation of the workpiece pattern to the coarse array representations of an existing set of reference characters. For new reference characters for which no identical coarse array representation is found, an identifying character code is stored in a first database with the new coarse array representation of the reference character as its address. For a new reference character for which an identical coarse array representation is found, second database entries for a new set of reference characters represented by identical coarse arrays are generated, and a first database entry containing the number of reference characters in the new set and the address of the first of the second database entries for the set is established.

The pattern learning system may use a measure of distinctiveness for isolating the most distinctive portions of fine array representations of reference characters represented by identical coarse arrays; the most distinctive portions are used by the pattern recognition system to resolve ambiguities between reference characters represented by identical coarse arrays.

Advantages of the pattern recognition system of the present invention over prior art systems include shorter processing time for each character recognition analysis resulting from the fewer character comparisons necessary to unambiguously identify a workpiece character. Specifically, for reference characters having unambiguous coarse array representations, only coarse analysis need be performed. Further, since reference characters represented by identical coarse arrays are organized into sets of reference characters, called ambiguous sets, and fine analysis is confined to the members of the one ambiguous set which shares the same coarse array representation as the workpiece character, the number of members of the ambiguous set is the maximum number of characters examined during fine analysis.

On an even more fundamental level, since the coarse analysis is conducted using a coarse array scheme, the number of picture elements which are analyzed to identify a workpiece character or to classify it into a set is limited to the number of picture elements in the coarse array.

Further, in fine analysis, only the most distinctive portions of a fine array representation of a reference character are examined; therefore, the number of picture elements which identify a workpiece character not having a distinctive coarse array representation is limited to the number of picture elements in the most distinctive portions of the fine array representation of the reference character.

BRIEF DESCRIPTION OF THE DRAWING

FIG. 11 shows diagrammatically the maximum discrimination matrix which is constructed from the twelve learning matrices.

FIG. 13 shows an example of generating second database entries for characters represented by identical coarse arrays.

DETAILED DESCRIPTION

Figure 1:
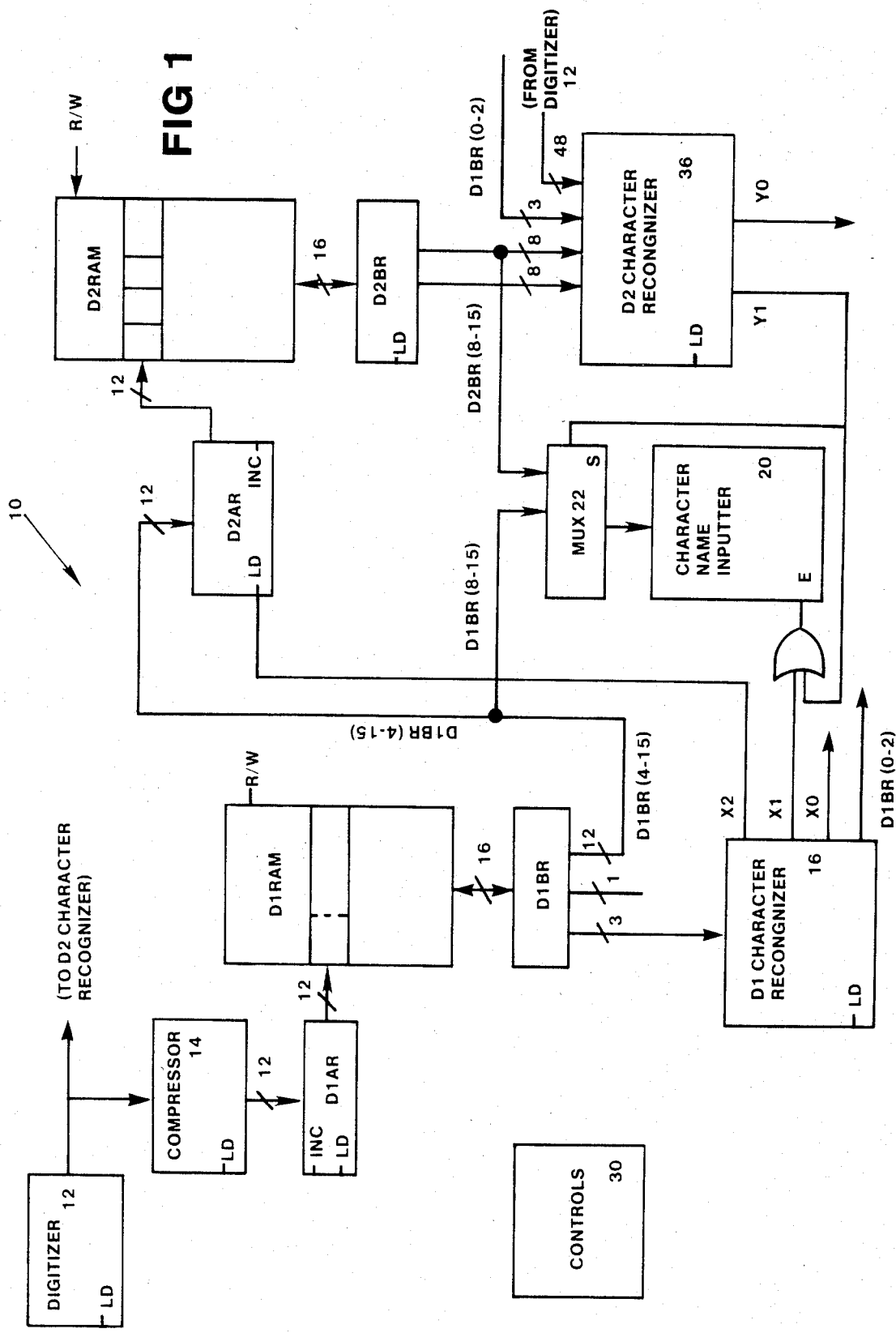
FIG. 1 shows a block diagram of an apparatus for operating the pattern recognition system of the present invention.

There is shown in FIG. 1 a block diagram of an apparatus for operating the character recognition system 10 of the present invention. The system 10 has a digitizer 12 with which a pattern is quantized into a 6×8 array of binary elements (the fine array), the compressor 14 in which a 48 element fine array is compressed into a 3×4 array of binary elements (the coarse array), and a character name inputter 20 with multiplexer 22 for accepting the name of the character once a workpiece character is identified.

Pattern recognizing system 10 has a first database D1RAM. Each entry thereof being addressed by a 12-bit value of a coarse array. Each entry in D1RAM has a multiplicity field of three bits which contains the number of characters in the reference set which have the coarse array value of the entry address. Each entry in D1RAM has a second field with contents which depend on the value in the multiplicity field of the entry. When the entry in the multiplicity field of the entry in 1 (meaning there is only one reference character with a coarse array value equal to the entry address) the second field contains the identifying code of the single reference character. When the value in the multiplicity field is greater than 1 (meaning there are a plurality of reference characters with coarse array values equal to the entry address). The second field contains an address to D2RAM.

D2RAM contains an entry for each reference character set which has a coarse array value equal to that of any other character. (That is all that do not have unshared coarse array values.) All characters with a common value of coarse array value are called an ambiguous set and the entries therefor are contiguous in D2RAM. The first address for the entries of an ambiguous set is that given for the set in D1RAM.

Each D2 entry is organized into seven fields over two words of D2RAM memory. In the first word of a D2 entry, the first and third fields contain information identifying the two subsets of the 48 element fine array of that reference character which are most discriminating with respect to the other members of its ambiguous set; the second and fourth fields contain the values of the identified subsets. The fifth and sixth field in the second word of the D2 entry are reserved; the seventh field contains the identifying code for the reference character.

Returning to FIG. 1, the apparatus for use in coarse analysis has D1RAM, a first database address register D1AR arranged to be loaded with the coarse array representation of an workpiece character, a first database buffer register D1BR arranged to accept a 16 bit word from D1RAM, and a first database D1 character recognizer 16 arranged to be loaded with the first field of the D1 entry.

The apparatus for use in fine analysis has D2RAM, a second database address register D2AR arranged to be loaded with the second field of a D1 entry, a second database buffer register D2BR arranged to accept a 16 bit word from D2RAM, and a second database character recognizer 36 arranged to be loaded with the fine array representation of a workpiece pattern and the first word of a D2 entry.

Figure 2:
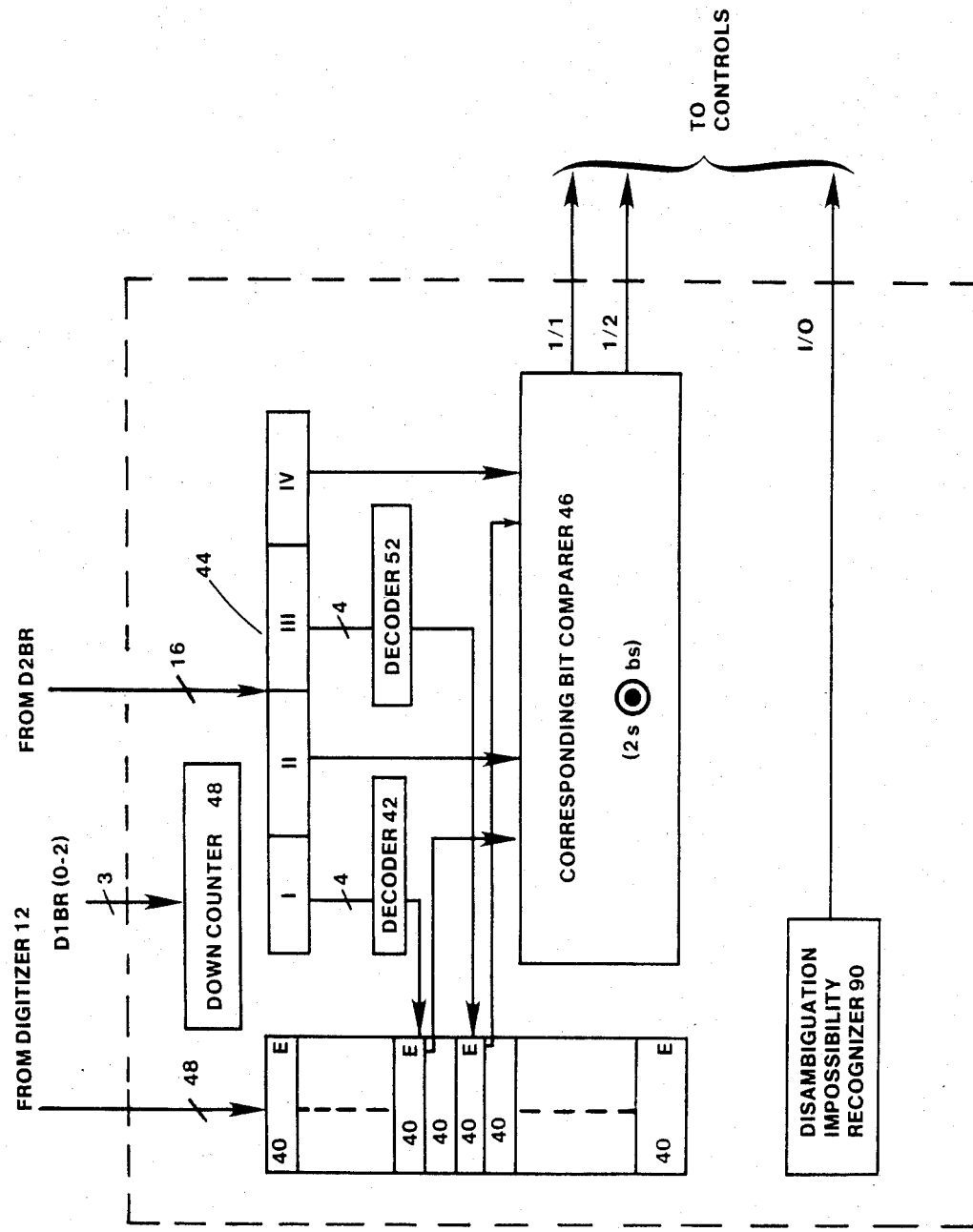
FIG. 2 shows a block diagram of the D2 Character Recognizer shown in FIG. 1.

As seen in more detail in FIG. 2, D2 character recognizer 36 has 12 four bit cell registers 40 in which the 48 element fine array representation of the workpiece pattern is stored temporarily during both coarse and fine analysis, a 16 bit register 44 into which the first word of a D2RAM entry is loaded from D2BR, decoders 42, 52 arranged to select two of the cell registers 40 from address location information stored in sections I and III of register 44, a corresponding bit comparer 46 arranged to do an exclusive-NOR comparison on the contents of the two registers 40 selected by decoders 42, 52 and the element values stored in sections II and IV in register 44, and a disambiguation impossibility recognizer 90 arranged to be enabled by decoders 42, 52 to indicate that workpiece pattern can not be identified unambiguously but may be one of two or more members of an identified ambiguous set.

Figure 3:
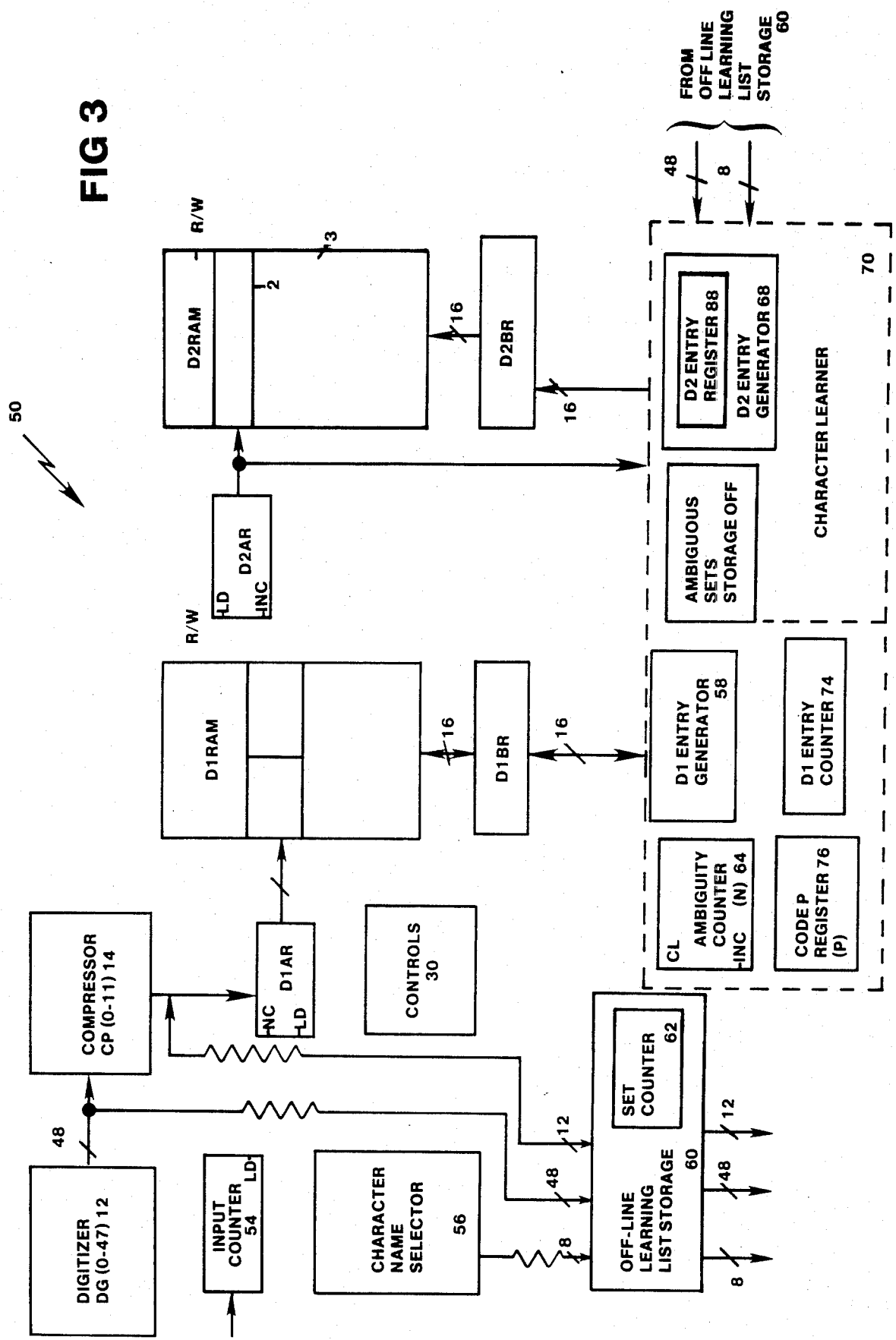
FIG. 3 shows a block diagram of an apparatus for operating the pattern learning system of the present invention.

In FIG. 3, a block diagram is shown of an apparatus for operating the characters learning system 50 of the present invention. Learning system 50 shares, with recognition system 10, controls 30, digitizer 12, compressor 14, D1RAM, D1AR, D1BR, D2RAM, D2AR and D2BR. Learning system 50 has an input counter 54 arranged to be loaded with the number of reference characters to be encoded and inputted into pattern recognition system 10, a character name selector 56 for inputting an identifying binary code CH(0-7) for each inputted reference character, and (normally offline) learning list storage 60 for storing the coarse and fine array representations and CH(0-7) for every reference character. List storage 60 has a set counter 62 arranged to be loaded with the number of reference characters in storage 60.

Character learning system 50 has character learner 70 arranged to accept the first field of a D1BR entry into ambiguity counter 64, the second field into code register 76, and CH(0-7) and the contents of D2AR into D1 entry generator 58, in order to generate a D1 entry in D1 entry generator 58 based on the value of ambiguity counter 64. Character learner 70 also has D1 entry counter 74 arranged to be loaded with the number of entries in D1RAM.

For generating D2 entries, character learner 70 is arranged to accept CH(0-7) and the contents of code register 76 into ambiguous set storage 66 in order to isolate sets of reference characters represented by identical coarse arrays. Character learner 70 has D2 entry generator 68 arranged to accept the fine array representations of every member of an ambiguous set as stored in ambiguous sets storage 66 in order to determine the most descriminating portions of each reference character with respect to the other members of its ambiguous set and, accordingly, generate entries for D2RAM.

OPERATION

Character Recognition System

In operation, the character recognition system 10 uses digitizer 12 to encode workpiece character, into a 48 element fine array of binary numbers representative to the positional distribution of optical density within the pattern.

Figure 4:
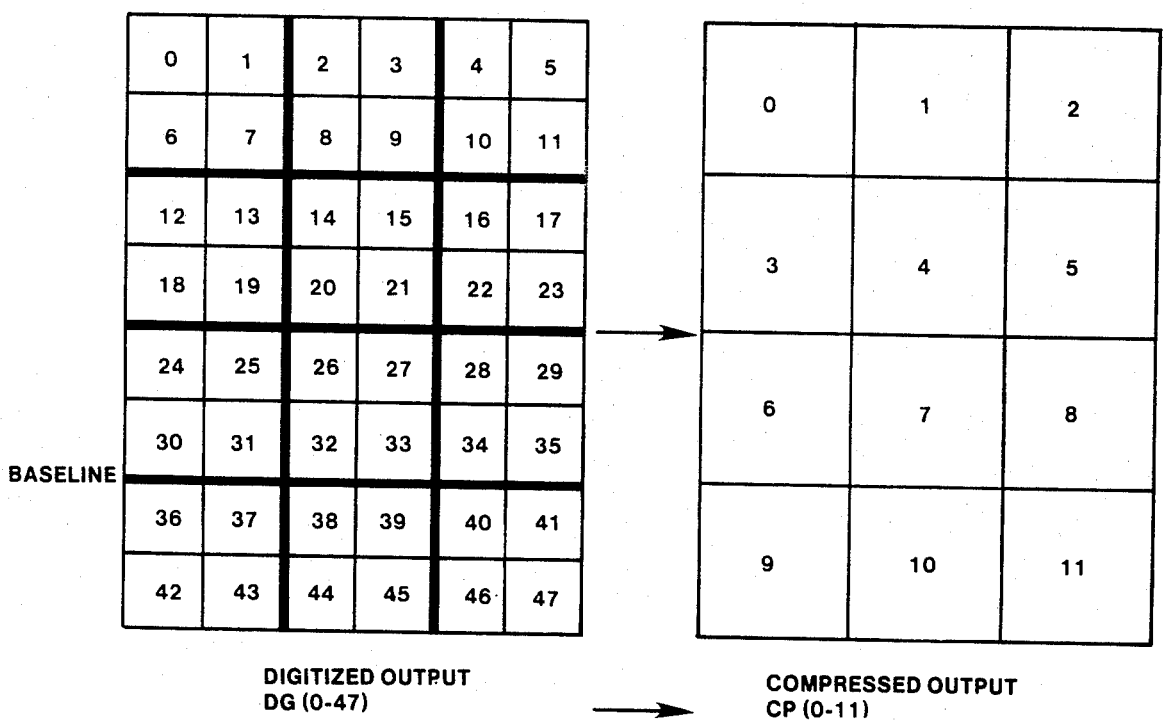
FIG. 4 shows diagrammatically the coarse and fine arrays into which each character is organized.
Figure 5:
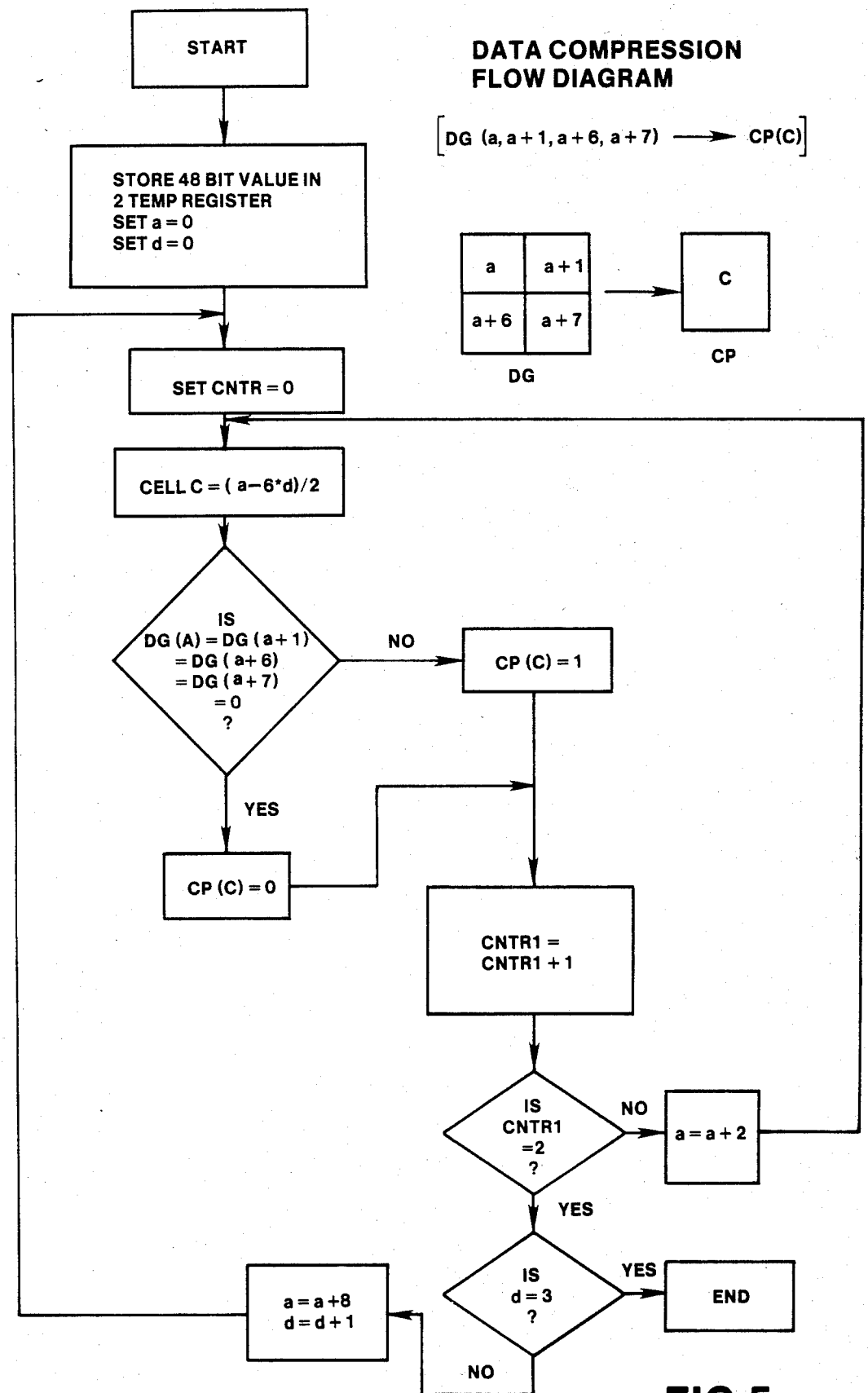
FIG. 5 shows a flow charted representation of the program which is used to compress a fine character array into a coarse character array.

The character is baseline and left-most justified with respect to a template with a 6×8 array of picture fields, where the descending portion of a character occupies the lower two rows of the array, and an ascending portion occupies the first two rows. A value 1 is assigned to an element of the coarse array if any part of a character appears in the corresponding field of the template and otherwise a 0 is assigned. The fine array, which is temporarily stored in cell registers 40 within D2 character recognizer 48, with values derived from one block of four picture fields in each register, is compressed into a 3×4 coarse array by operation of compressor 14, which converts the 48-bit output value DG(0-47) of digitizer 12 into the compressed 12-bit output value of the compressor 14. The conversion is equivalent to redefining the size of the fields of the template grid. As seen in FIG. 4, each element of CP(0-11) represents the same area as a block of four picture elements of DG(0-47). Recognition system 10 employs a data compression program 15 which essentially establishes a value of "1" to a compressed picture element, hereinafter called a cell, if any of the corresponding four picture elements in the fine array equals "1". A data compression program written in Algol (and flowcharted in FIG. 5) follows. In both the program and the flowchart, "a" is a picture element of the fine array, "c" is a cell of the coarse array, and "d" is a row counter for the coarse array.

| Program: Data Compression |
|---|
| a = 0 |
| DO d = 0, 1, 2, 3 |
| DO a = 2, a+2, a+4 |
| c = (a−6*d)/2 |
| IF DG(a) OR DG(a+1) OR DG(a+6) OR DG(a+7)=1, |
| THEN CP(c)=1; ELSE |
| CP(c)=0 |
| a = a+8 |

Examples of digitized compression are shown in FIG. 11, where the letter "T" of a Courier 12 font is shown superimposed on a 6×8 element digitizing grid and in fine and coarse array representations.

For the coarse analysis, controls 30 load D1AR with CP(0-11), the coarse array representation of the workpiece pattern. CP(0-11) operates as an address to a D1RAM entry, which is then read into D1BR. Controls 30 cause D1 character recognizer 16 to be loaded with the first three bits of D1BR, hereinafter called N, which contain the multiplicity, of reference characters represented by the coarse array CP(0-11).

If the first three bits D1BR(0-2) equal zero, then no reference character in the current recognition system is represented by the coarse array of the workpiece pattern. D1 character recognizer 16 generates a signal X0, upon receipt of which controls 30 order a second encoding, decompression, and analysis of the workpiece character. If recognition system 10 is unable to identify the workpiece pattern after a second analysis and the signal X0 is generated twice in a row, controls 30 cause character name inputter 30 to accept an "unidentified character" code. The operator of recognition system 10 may elect to incorporate the workpiece pattern into the set of reference characters by triggering the pattern learning system 50, described below.

If D1BR(0-2) equals one, the coarse array defined by CP(0-11) represents only one reference character. D1 character recognizer 16 generates a signal X1 which causes character name inputter 20 to be loaded with D1BR(8-15), the identifying binary character code for the reference character represented by the coarse array CP(0-11). Controls 30 then trigger digitizer 12 to digitize the next workpiece character for input into recognition system 10.

If D1BR(0-2) is greater than one, the coarse array CP(0-11) represents a distinct ambiguous set of reference characters. D1 character recognizer 16 generates the signal X2 which triggers a fine analysis to resolve the ambiguity. Controls 30 cause N, the number of the reference characters in the ambiguous set so identified, to be transferred from D1 character recognizer 16 to ambiguity down counter 48 within recognizer 36. Controls 30 also cause D2AR to be loaded with D1BR(3-15), the address the first D2RAM entry of the ambiguous set so identified. The first word of the D2RAM entry addressed by D2AR is read first into D2BR and then into register 44 of the D2 character recognizer 36.

As described above, the first word of a D2RAM entry for a reference character contains the locations and element bit values of the most distinctive portions of the reference character with respect to the other members in its ambiguous set. In this embodiment, the portions analyzed for distinctiveness by character learner 70 correspond to cells of a coarse array, one of which is shown in FIG. 4. Specifically, each of the first and third fields in a D2 entry contains a binary number from 0 to 11, identifying which two of the twelve cells of a reference character are sufficiently distinctive to resolve ambiguities between the reference character and other reference characters in its ambiguous set. The second and fourth fields contain the element bit values of those distinctive cells. The first and third fields may also contain the number 15, indicating a reference character of an ambiguous set which can not be unambiguously identified.

As seen in FIG. 3, controls 30 cause the first and third field of a D1 entry to be loaded into sections I and III of register 44, and the second and fourth fields to be loaded into sections II and IV of register 44. Decoders 42, 52, attached to the outputs of section I and III, decode the first and third fields of the D2 entry and, if the binary numbers are between 0 and 11, enable the reading of two of the twelve temporary registers 40; if decoders 42, 52 decode the number 15, they enable the disambiguation impossibility recognizer 90.

We return to character recognition by D2 character recognition 36. As described above, cell registers 40 store the 48 element fine array representation of the workpiece pattern, one cell to each four bit register 44. Decoders 42, 52 enable the reading of the two cell registers 40 which correspond to the distinctive cells of the fine array. In corresponding bit comparer 46, the element bit values of Section II and the cell register 40 enabled by decoded Section I and the element bit values of Section IV and the cell register 40 enabled by decoded Section III are compared, bit by bit, for equivalance by exclusive-NOR circuitry.

If both corresponding cells are identical, then the workpiece pattern is identified as the reference character for which the present D2RAM entry has been generated. Corresponding bit comparer 46 generates the signal Y2 which causes controls 30 to increment D2AR so that the second word of the D2RAM entry, which contains the identifying binary character code for the reference character, is read into D2BR. Y2 also enables character name inputter 20 and multiplexer 22 to accept the identifying character code D2BR(8-15) from D2BR, and triggers digitizer 12 to digitize the next workpiece character for identification.

If corresponding bit comparer 46 does not find identical corresponding cells, it generates the signal Y1 which causes controls 30 to start a fine analysis of the next reference character in the ambiguous set. Controls 30 decrement the ambiguity down counter 48; if it does not equal zero, the ambiguous set contains more reference characters against which the workpiece pattern may be compared, so controls 30 increment D2BR twice so as to access the first word of the D2RAM entry of the next reference character in the ambiguous set. Fine analysis of reference characters continues until the workpiece pattern is identified or unit all of the members of the ambiguous set have been analyzed.

When ambiguous down counter 18 is zero and the disambiguation recognizer 90 has been activated during analysis of the ambiguous set, D2 character recognizer 38 generates the signal Y0. Upon receipt of Y0, controls 30 cause D2AR to be incremented and the character code in D2 entry field seven to be inputted into character name inputter 20 along with an ambiguity indicator. In this manner, a similar if not unambiguously identified reference character is included in the system output for use in visual inspection by the operator.

When ambiguity down counter 48 equals zero, and the disambiguation impossible recognizer 90 has not been activated during analysis of the ambiguous set, controls 30 order a second encoding, compressing, and analysis of the workpice character. If character recognition system 10 is unable to identify the workpiece pattern after the second try, controls 30 cause D2AR to be incremented and the character code character in D2 entry field seven to be loaded into character name inputter 20 along with an ambiguity indicator. The operator of recognition system 10 may choose to incorporate the workpiece character into the reference set by triggering 10 character learning system 50.

CHARACTER LEARNING SYSTEM 50

Whether the character learning system 50 is triggered to add one or more new characters to an existing reference character set or to incorporate a completely new reference set into D1RAM and D2RAM, the procedures which system 50 follows are identical. The only difference between the two is that the operator of system 50 clears offline learning list storage 60, which normally holds all data on the reference set, and set counter 62, which normally holds the number of patterns in the reference set, if an entirely new reference set is to be inputted.

Figure 6:
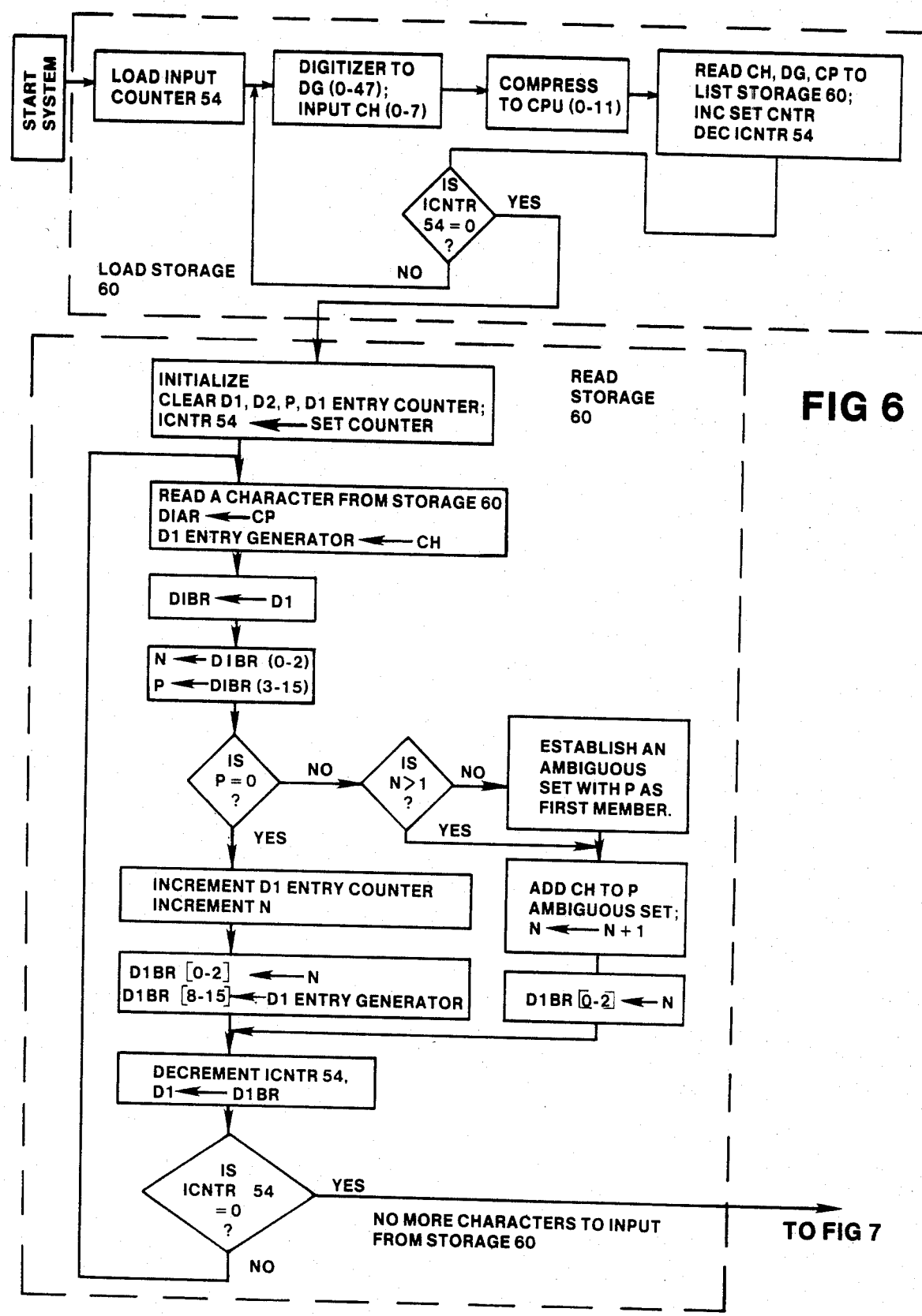
FIG. 6 shows a flow charted representation of the pattern learning system for generating sets of reference characters represented by identical coarse arrays and entries in a first database for reference characters having unambiguous coarse array representations.

Flowcharted procedures for character learning system 50 are shown in FIGS. 6-9. As seen in FIG. 6, which shows the procedure for generating D1 entries for reference characters having unambiguous coarse arrays, the operator of character learning system 50 loads into input counter 54 the number of characters to be inputted. The number in counter 54 thus is either the number of characters to be incorporated into an existing set reference or the number of members of a new reference set. The operator of learning system 50 then places the first character leftmost and baseline justified onto the 6×8 element digitizing grid of digitizer 12. Control is transferred to compressor 14, which comprises the fine array DG(0-47) into the 12 element coarse array CP(0-11) with the same compression program described above and shown in FIG. 5. System 50 pauses until the operator inputs, through character name selector 56, the binary coded character name CH(0-7) of the new reference character.

Controls 30 then cause the new reference character to be added to the reference set by loading the CH(0-7), CP(0-11) and DG(0-47) into offline learning list storage 60 and incrementing set counter 62. Controls 30 then decrements input counter 54. If input counter 54 has not reached zero, there are more characters to add to list storage 60, and control is again transferred to digitizer 12.

If input counter 54 is zero, then all new characters have been added to list storage 60; controls 30 cause character learner 70 of learning system 50 to generate D1RAM and D2RAM entries for every reference character stored in learning list storage 60. Controls 30 generate signals to clear D1RAM, D2RAM, code register 76, and D1 entry counter 74. Controls 30 also load input counter 54 with the contents of set counter 62 so that the number of reference characters that are being entered into character recognition system 50 may be monitored through input counter 54.

Controls 30 then cause the character code CH(0-7) for the first character in storage 60 to be read and loaded into D1 entry generator 58 within character learner 70. The coarse array CP(0-11) of the first character is loaded into D1AR, where it operates as an address to a D1RAM entry, which is read into D1BR. Controls 30 cause ambiguity counter 64 within character learner 70 to be loaded with the first three bits of D1BR, so that ambiguity counter 64 contains the number, called hereinafter "N", of reference characters represented by the coarse array CP(0-11). Controls also cause the remainder of D1BR, D1BR(3-15) to be loaded into code register 76 with character learner 70.

When the character code, hereinafter called "P", in code register 76 is equal to zero, no previously inputted reference character has been represented by the course array CP(0-11) currently stored in D1AR; D1 entry generator 58 generates a D1 entry for the reference character being inputted. D1 entry counter 74 is incremented to include the new D1 entry, while ambiguity counter 64 is incremented and N written into D1BR[0-2]; the character code CH(0-7) which had been stored in D1 entry generator 58 is written into D1BR[8-15].

When P does not equal zero (indicating that a D1 entry had been generated for an earlier-introduced reference character also represented by coarse array CP(0-11)), character learner 50 operates to either set up an ambiguous set for the reference characters represented by P and CH(0-7) or to add CH(0-7) to an already established ambiguous set of which the reference character represented by P is a part.

To determine whether an ambiguous set has already been established, N, the number of reference characters represented by the coarse array CP(0-11), is examined.

If N is greater than 1, then an ambiguous set having P as a member has already been established in ambiguous set storage 66; controls 30 cause CH(0-7) to be added in storage 66 to that ambiguous set. If N equals 1, no such ambiguous set has been established; controls 30 cause an ambiguous set to be formed, with P as its first member and CH(0-7) as its second member. In both cases, ambiguity counter 64 is incremented the include the new reference character, and N is loaded into D1BR[0-2].

At this point, whether or not the coarse array CP(0-11) was found to represent an unambiguous pattern or an ambiguous set, the new D1 entry is written into D1RAM at the location addressed by CP(0-11). Input counter 54 is then decremented; if it is not equal to zero, list storage 60 contains more reference characters to be entered into D1RAM. Controls 30 cause the next character in from storage 60 to be read into D1AR and character learner 70. If input counter 54 is zero, the entire reference set has been read from storage 60; controls 30 trigger the portion of the learning system 50, shown in FIG. 8, which generates D2 entries and final D1 entries for ambiguous reference characters.

Figure 7:
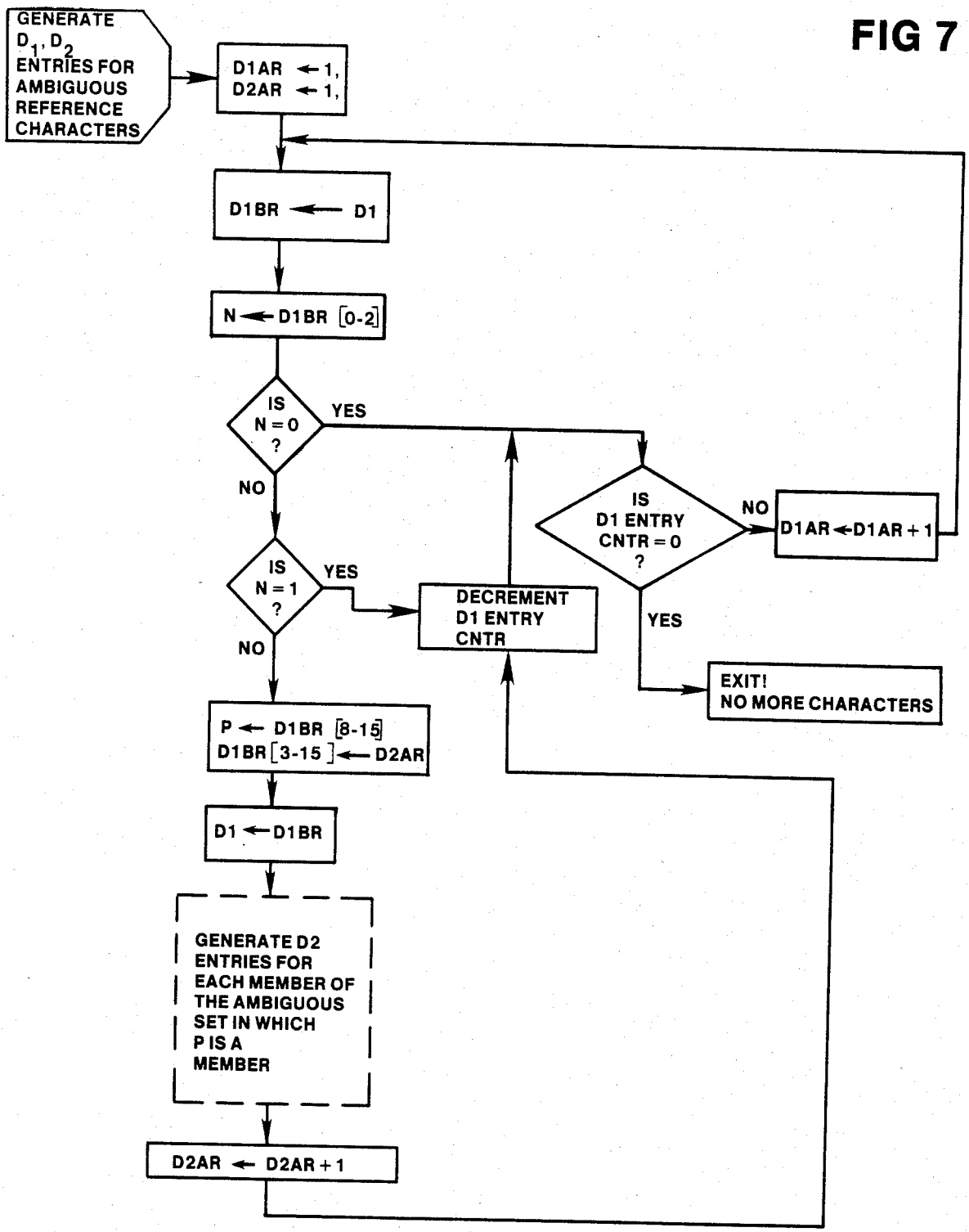
FIG. 7 shows a flow charted representation of the pattern learning system for generating first database and second database entries for reference characters represented by identical coarse arrays.

As seen in FIG. 7, controls 30 cause the value of 1 to be loaded into D1AR and D2AR, so that both the first and second database both address registers are set to reference their first available memory spaces. Controls 30 cause the D1RAM location so addressed to be read into D1BR. Ambiguity counter 64 is then loaded with D1BR[0-2], and its contents N are examined. If N equals 0, no reference character in storage 60 is represented by the coarse array in D1AR; neither D1 nor D2 entries are generated. Character learner 70 accesses the next D1 entry.

Specifically, if D1 entry counter 74, which holds the number of D1 entries which have not been analyzed, equals 0, there are no more D1 entries from which D2 entries may be generated. The D2 entries for every ambiguous set have been generated, so character learning system 50 ends.

If D1 entry counter 74 is non-zero, at least one D1 entry has not yet been analyzed; controls 30 cause D1AR to be incremented, and the next addressable D1 location is read into D1BR. If the first field of the D1 entry, i.e. N, is equal to one, the coarse array courrently in D1AR is representative of the single reference characters identified by D1BR[8-15]; a D2 entry is not generated. Since the D1 entry is in final form, controls 30 cause the next addressable location in D1RAM to be analyzed.

If, instead, N is greater than one, the coarse array CP(0-11) currently in D1AR represents more than one reference character. Character learner 70 preceeds to generate sequential D2 entries for each of the reference characters represented by CP(0-11) and a D1 entry addressing the first of those D2 entries. Character learner 70 loads code register 76 with D1BR(8-15) and loads D1BR(3-15) with D2AR, the address of the first available location in D2RAM. Controls 30 write D1BR into the D1RAM entry addressed by D1AR, and then generates the D2 entries for every member of the ambiguous set of which P is a member.

As described above, there is a D2 entry for every reference character which is not represented by an unambiguous coarse array. Each D2 entry consists of seven fields over two D2RAM words, with the first four fields containing information as to the location and element values of the two most distinctive portions of the reference character in issue with respect the other members of its ambiguous set. The second word of the D2 entry has a reserved fifth and sixth fields and a seventh field which contains the identifying binary character code for the reference character in issue.

Figure 8:
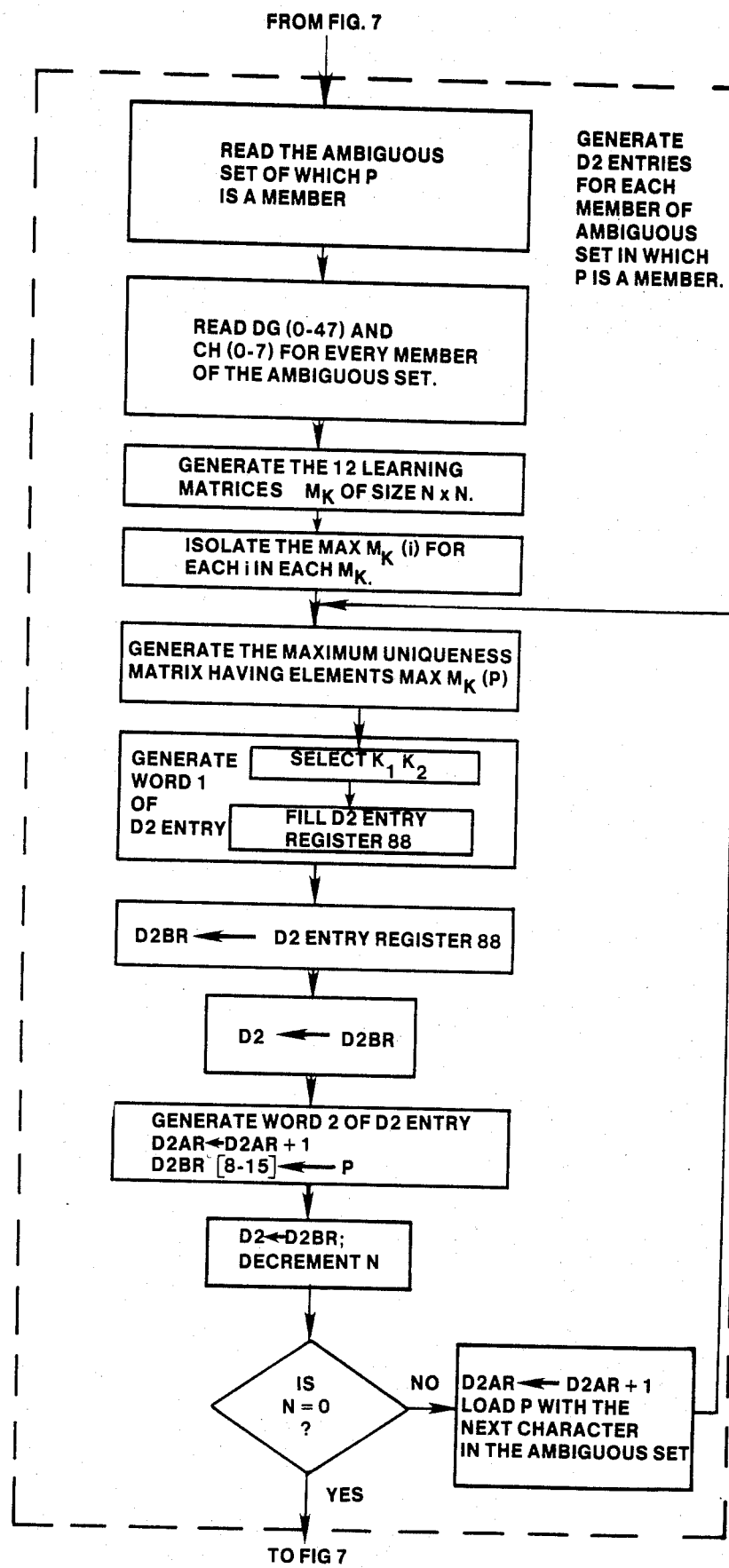
FIG. 8 shows a more detailed flow chart of second database entry generation, as shown in FIG. 7.

As seen in FIG. 8, which is a more detailed flow chart of the D2 generation portion of FIG. 7, controls 30 cause character learner 70 to read ambiguous set storage 66 for a list of the binary codes CH(0-7) of all of the members of the ambiguous set of which P, as stored in code register 76, is a member. Controls 30 then cause character learner 70 to read, from offline learning list storage 60, the fine array representations DG[0-47] for every member of the isolated ambiguous set.

Character learner 70 then starts the procedure by which most distinctive cells of each member of the ambiguous set are isolated. It examines each character individually and generates a measure of relative cell distinctiveness for every cell of that character with respect to every member of the ambiguous set. It organizes the cell distinctiveness measures into twelve matrices $M_0$-$M_{11}$, one matrix for each of the twelve cells in a character.

Figure 10:
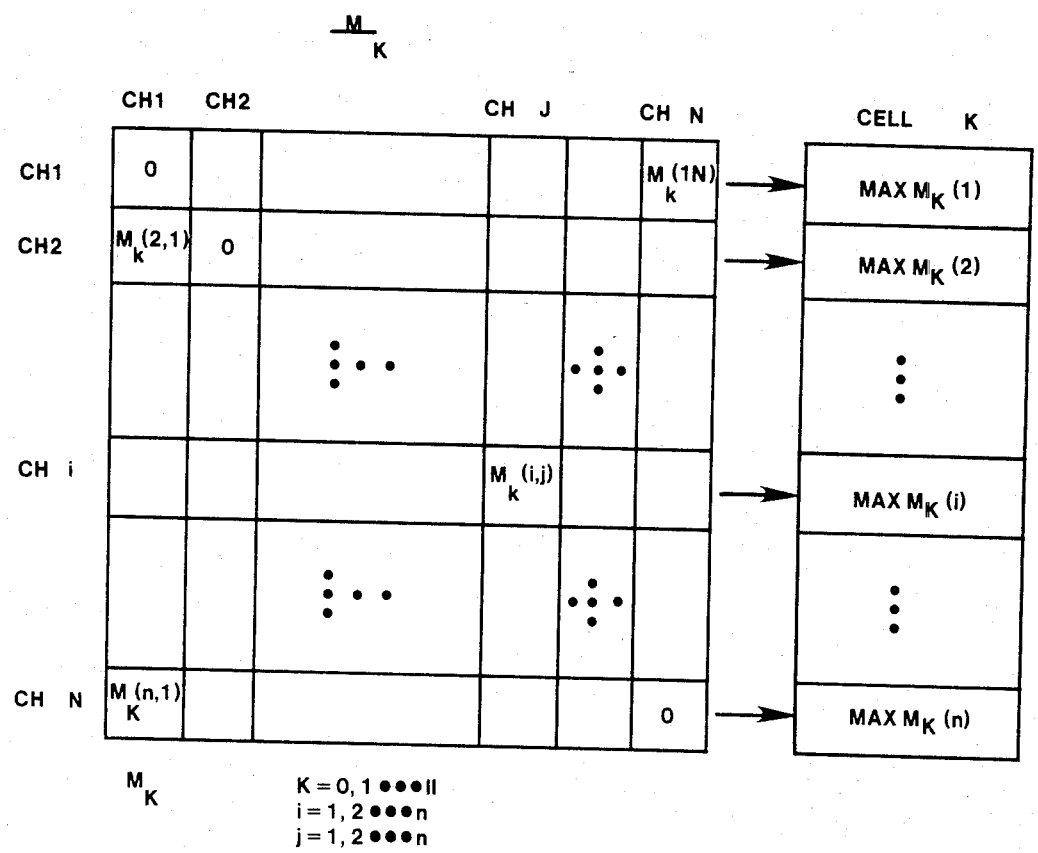
FIG. 10 shows diagrammatically one of the twelve learning matrices constructed during the pattern learning system for generating D2RAM entries.
Figure 12:
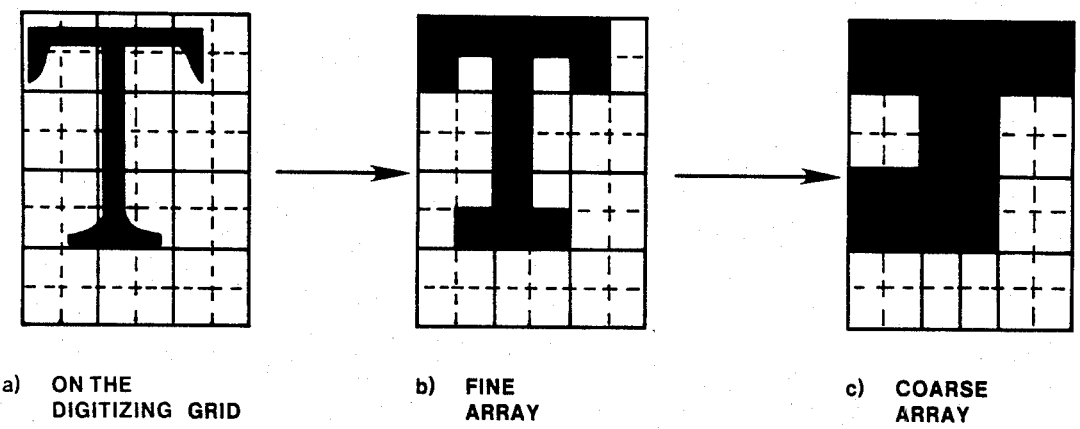
FIG. 12 shows an example of digitizing and compressing a typical character.
Figure 14:
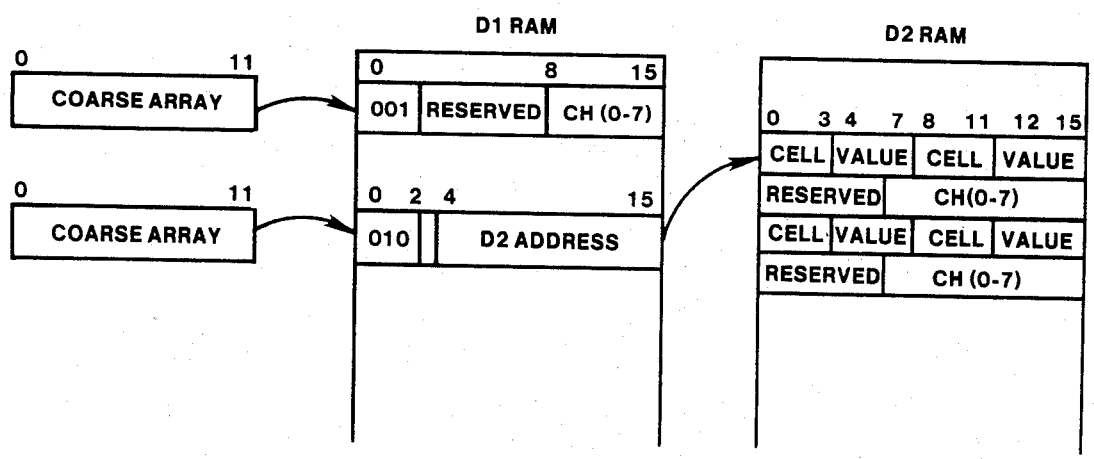
FIG. 14 shows the structure by which the entries of the first and second databases are organized.

A representative matrix $M_K$, $K=0,1,\ldots 11$, is shown in FIG. 10. Each element of $M_K$, called $M_K(i,j,)$ is a measure of cell distinctiveness for cell K in character i with respect to character j. Each $M_K$ is of size NxN, having one column and one row for every member of the ambiguous set. Since cell distinctiveness of character i with respect to character j is the same as that of character j with respect to character i (i.e., $M_K(i,j)=M_K(j,i)$) and a character compared to itself has zero distinctiveness, each matrix $M_K$ is symmetric with zeros in its diagonals.

In this embodiment, the measure of cell distinctiveness is the number of non-identical elements within corresponding 4-element cells of two characters. In other words, $M_K(i,j)$ is the summation of an exclusive-OR comparison of each of the four bits in corresponding cells K of two characters i, j. Using this measure the value 0 indicates that the corresponding cells are identical in i and j and a value of 4 indicates that corresponding cells K are totally dissimilar, having the greatest amount of relative cell distinctiveness.

As an illustration, FIG. 13 shows an ambiguous set consisting of D, C, and O, each of which are represented by the common coarse array CP(0-11)=(111101111000), shown in FIG. 13.e. The twelve learning matrices for D, C, and O are shown in FIG. 13.f. As can be easily seen, each element of the matrices $M_9$-$M_{11}$ for character cells below the descender line, is zero. Further, all of the elements of $M_1$, $M_2$, $M_3$, $M_4$, $M_7$, and $M_8$ are zero because corresponding cells 1, 2, 3, 4, 7, and 8 in D, C, and O are identical.

To generate $M_0$, character learner 70 examines cell 0 in each of the reference characters D, C, and O. Since cell 0 in C is identical to cell 0 in O, $M_0(C,D)=M_0(O,C)=0$, Further, $M_0(D,C)=(1+0)+(1+1)+(1+0)+(0+1)=2=M_0(C,D)$, and $M_0(D,O)=M_0(O,D)=2$.

Returning to FIG. 8, after all twelve learning matrices are generated character learner 70 isolates the maximum cell distinctiveness value $maxM_K(i)$ for every character in matrix $M_K$ as seen in FIG. 10, there are N maximum cell distinctiveness values for every cell K. As shown in FIG. 11, character learner 70 organizes all of the maximum cell distinctiveness values into a maximum distinctiveness matrix of size N×12 for use with the 12 learning matrices in isolating, for each character in the ambiguous set, the two most distinctive cells, hereinafter called $K_1$ and $K_2$, which will be used by character recognition system 10 to resolve ambiguities between that character and the other members of its ambiguous set.

It should be noted that $K_1$ and $K_2$ are not selected solely on the basis of their maximum cell distinctiveness values. In some ambiguous sets, the two cells of a pattern having the numerically greatest maximum cell distinctiveness values can not be used to resolve ambiguities within the set, because at those cell locations, the structure of the pattern is identical to the structure of another pattern in its ambiguous set.

An example of this is seen in FIG. 13, in which cell 0 and cell 6 of character C have the numerically greatest maximum cell distinctiveness values (i.e., 2) because of the structural differences between the characters C and O, but can not be used to resolve differences between C and O because they are identical to cell 0 and cell 6 of character O.

Keeping all of the above in mind, we turn to the manner in which character learner 70 makes $K_1$ and $K_2$ selection. Specifically, $K_1$ and $K_2$ are selected as the most distinctive cells of a reference character P based on a large maximum distinctiveness value and the requirement that both of the cells $K_1$ and $K_2$ of character P can not be identical to the cells $K_1$ and $K_2$ of any other pattern in its ambiguous set.

Figure 9:
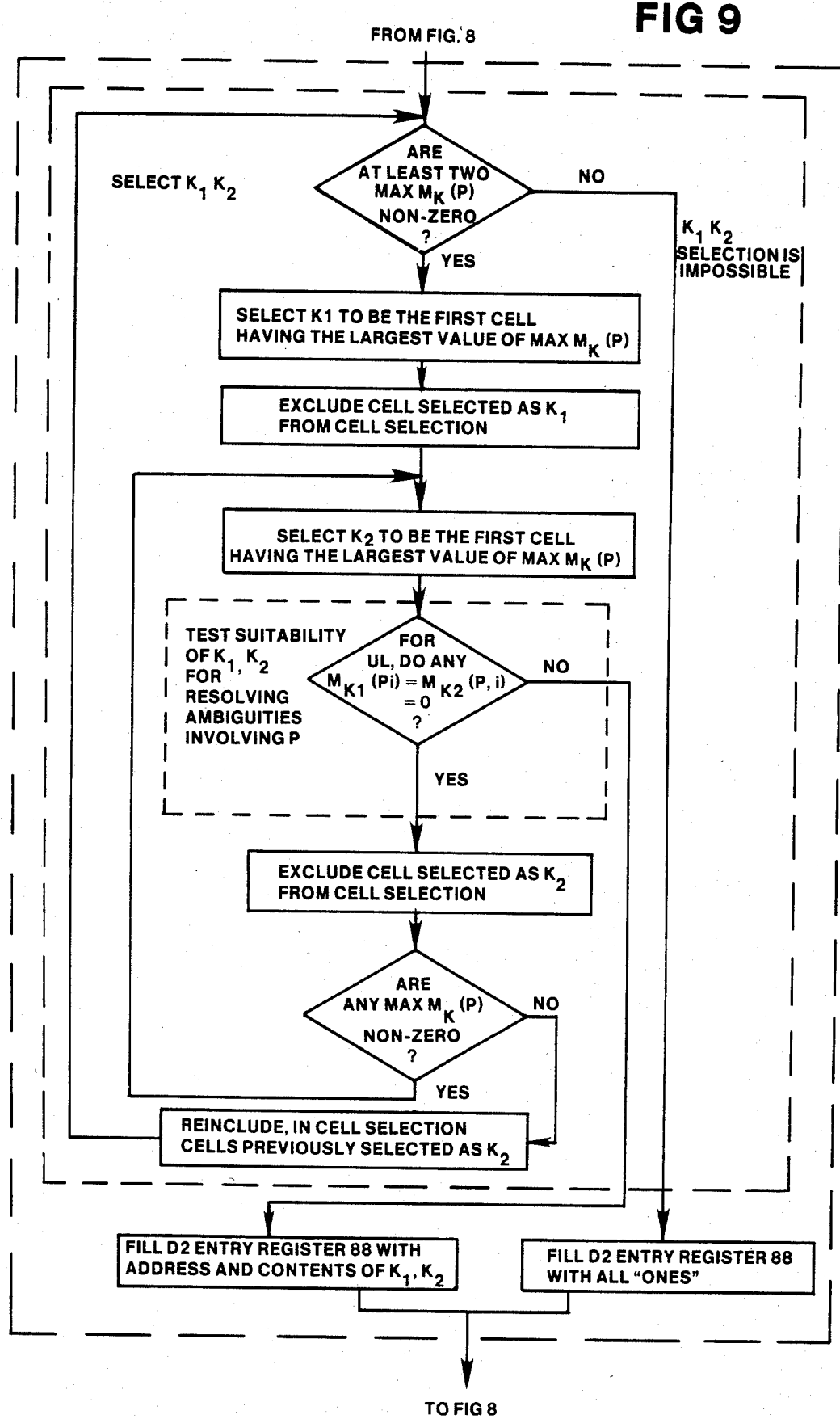
FIG. 9 shows a more detailed flow chart of distinctive cell selection, as shown in FIG. 8.

As seen in FIG. 9, character learner 70 first generates the maximum distinctiveness matrix row for the character identified by P. Analyzing that row and the 12 learning matrices, character learner 70 selects $K_1$ and $K_2$, the address and contents of which are loaded into D2 entry generator 88.

The first step in selecting $K_1$ and $K_2$ is to determine whether there are at least two values of $maxM_K(P)$ which are non-zero; if not, $K_1$ and $K_2$ selection for character P is impossible, and ambiguities between P and the other members of the ambiguous set cannot be resolved. Controls 30 cause D2 entry register 88 to be filled with all ones so that, when the D2 entry for P is accessed during use of pattern recognition system 10, values of fifteen in Sections I and III of D2 character register 44 cause disambiguation impossiblity recognizer 90 to be activated.

If there are at least two non-zero $maxM_K(P)$ values, character learner 70 selects, as an intial $K_1$, the first cell in the maximum distinctiveness matrix row that has the largest value of $maxM_K(P)$. The cell selected as initial $K_1$ is then excluded from further cell selection for two reasons: to avoid selecting one cell as both $K_1$ and $K_2$ and to keep track of which cell combinations have been tested for $K_1$, $K_2$ ambiguity-resolving suitability.

Character learner then selects, as an initial $K_2$, the first cell in the matrix row having the largest value of $maxM_K(P)$. The $K_1$, $K_2$ cell combination is then tested for ambiguity-resolving suitability. Character learner 70 compares learning matrices $M_{K1}$, $M_{K2}$. If any other character i in the ambiguous set is identical to P at cells $K_1$ and $K_2$, then $M_{K1}(P,i) = M_{K2}(P,i) = 0$, and character learner 70 rejects $K_2$. It excludes the current $K_2$ from the set of eligible cells, checks to see if $maxM_K(P)$ is non-zero for at least one eligible cell, selects a second $K_2$, and tests the new $K_1$, $K_2$ cell combination for suitability in resolving ambiguities between P and the other members of its ambiguous set.

If there had been no eligible cells for which $maxM_K(P)$ was non-zero, then no more cells are presently available for selection as $K_2$. This does not mean that all cell combinations are unsuitable for ambiguity resolving. It only means that no suitable cell combinations include the cell initially selected as $K_1$ as a member; it is likely that a combination of two other cells, former $K_2$ selections, is suitable for resolving ambiguities.

Character learner 70 causes the cells earlier discarded as $K_2$ selections to be reincluded in the eligible cell set. To prevent retesting of cell combinations, earlier $K_1$ cell selections continue to be excluded from the eligible cell set. Character learner 70 selects a new $K_1$ and tests it with the eligible $K_2$ cells for ambiguity-resolving suitability. It continues this cycle until a suitable $K_1$ and $K_2$ are selected or until it has tested every combination of cells having non-zero $maxM_K(P)$ values.

If a suitable set combination of $K_1$, $K_2$ cells is not isolated, character learner 70 causes D2 entry register 88 to be filled with all ones so that the first and second fields of the D2 entry indicate that disambiguation involving the character P is impossible.

If cells $K_1$ and $K_2$ are isolated, character learner 70 causes D2 entry register 88 to be filled with the address and picture element values of $K_1$, $K_2$.

An example of $K_1$, $K_2$ selection is illustrated in FIG. 13. Character learner generate the D row of the maximum distinctiveness matrix of FIG. 13.e, and selects cell 0 and cell 6, having distinctiveness values of 2, as initial $K_1$ and $K_2$ of matrices $M_0$ and $M_6$ shows that $M_0(D,C)$, $M_6(D,C)$ and $M_0(D,O)$ and $M_6(D,O)$ are all non-zero, so that cells 0 and 6 are a suitable combination for use in resolving ambiguities between D and the other characters in the ambiguous set.

Character learner then generates the maximum distinctiveness matrix row for the character C. It also selects cells 0 to 6 as initial $K_1$ and $K_2$, but a review of $M_6$ and $M_0$ shows that $M_6(C,O) = M_0(C,O) = 0$, indicating that the structure of characters C and O at cells 0 and 6 is identical. Character learner 70 excludes cell 6 from cell selection ahd chooses cell 5, having a distinctiveness value of 1, as $K_2$. Since C is not identical to either D or O at cells 0 and 5, there exist no $M_0(C,i)$ and $M_5(C,i)$ which both equal 0; cell 0 and 5 are a suitable cell combination for resolving ambiguities involving C.

Similarly, for character O, the initial selection of cells 0 and 6 prove unsuitable because of the identical structure of characters C and O at cells 0 and 6. Character learner 70 selects the combination of cells 0 to 5 to resolve ambiguities between O and the other member C and D of its ambiguous set. The D2 entries for D, C and O, generated by character learner 70, are shown in FIG. 13.f.

Returning to FIG. 8, controls 30 cause D2 entry register to be loaded into D2BR, and D2BR to be read into D2RAM at the location addressed by D2AR.

The second word of the D2 entry is then generated. D2AR is incremented to provide access to the next memory word in D2RAM, and character learner 70 causes P to be loaded into D2BR[8-15]. (In this way, even if ambiguities between P and another member of its ambiguous set, as somewhat similar pattern, one represented by the same coarse array, is available to be loaded into character name inputter 20). D2BR is read into D2RAM, and ambiguity counter 64 is decremented so that N includes one less unanalyzed reference character in the ambiguous set.

Character learner 70 continues to generate D2 entries for the rest of the members of the ambiguous set. As long as N is non-zero, character learner 70 increments D2AR to access the next memory location in D2RAM and loads code register 76 with P, the next character in the ambiguous set. When N becomes zero, character learner 70, which has generated D2 entries for all of the members of the ambiguous set defined by CP(0-11) in D1AR, the next D1 entry in D1RAM in order to isolate the next ambiguous set.

Returning to FIG. 7, character learner 70 increments D2AR to access the next available unfilled memory word of D2RAM and decrements D1 entry counter 74 to include one fewer unanalyzed D1 entry; if D1 entry counter 74 is non-zero, character learner 70 accesses the next addressable location in D1RAM.

If D1 entry counter is zero, character learner 70 has generated D1 and, if necessary, D2 entries for every reference character stored in the list storage 60. Controls 30 cause character learner 60 to exit pattern learning system 50.

Many variations of the apparatus within the scope of the invention will be apparent to a person skilled in the art.

For example, the first field of a D1 entry could be increased to accommodate reference sets having ambiguous sets with many members.

The recognizing and learning systems and apparatus could be modified to accommodate longer identifying character codes for reference characters in a larger reference set.

The apparatus and systems could also be modified to accommodate larger or smaller fine arrays. Generally, as the number of rows and columns in an array increases, the number of picture elements in the array decreases, and the apparatus and systems would be modified accordingly. Assuming the same data compression scheme is used, the coarse array would also be modified in size.

In some reference sets, for example, in some type fonts, there are no characters which occupy both ascender and descender space in a character window. In other words, there are no characters which occupy cells 0-2 and cells 9-11 at the same time. For a recognition system designed for these reference sets, a reference character may be represented by a 48 picture element fine array and a 9 cell coarse array. Digitizer 12 and compressor 14 would both still generate DG(0-47) and CP(0-11), but reference characters not occupying descender spaces would have coarse arrays corresponding to CP(0-8), while reference characters occupying descender space would have coarse arrays corresponding to CP(3-11). As before, the pattern learning system would isolate ambiguous sets of characters represented by initial coarse array, but, in this embodiment, where the coarse array would have 9 elements, ambiguous sets could contain seemingly dissimilar characters which are easily disambiguated during fine analysis of the 48 element fine array representations DG(0-47).

In reference sets of this sort, the fine array representations could also be modified to contain only 36 elements. Reference characters not occupying descender space would have fine arrays corresponding to DG(0-35), and reference characters occupying descender space would have fine arrays corresponding to DG(12-47).

The modifications necessary to the apparatus and systems of the preferred embodiment to accommodate the above suggested array modification will be obvious upon a review of the figures and the above description of the described embodiment.

What is claimed is:

1. Apparatus for generating a machine readable signal indicating which one of a set of reference characters corresponds to a visible pattern, including
    means for storing signals indicative of a set of reference fine n-dimensional array values, each reference fine array value corresponding to one of the reference characters,
    means for storing signals indicative of a set of reference coarse m-dimensional array values, where m is less than n, each reference coarse array value being derived either from a signal one only of said reference fine array values (in which case it will be designated an unambiguous value), or from any one of a plurality of said reference fine array values (in which case it will be designated an ambiguous value),
    means for measuring with an optical instrument a workpiece visible pattern in each of n fields to provide a signal indicative of a workpiece fine n-dimensional array value and means for storing said last named signal,
    means for forming a signal indicative of a workpiece coarse m-dimensional array value from said workpiece fine array value signal, first comparing means for comparing the signal of the workpiece coarse array value with the signals of the set of reference coarse array values to produce a signal indicating the identification of the workpiece pattern with either an unambiguous reference coarse array value or an ambiguous reference coarse array value, means responsive to a signal from said first comparing means indicative of identification with an unambiguous array value to generate a signal indicative of the reference character associated with the identified unambiguous array value, second comparing means responsive to a signal from said first comparing means indicative of identification with an ambiguous array value to compare signals indicative of values of a preselected subset of elements from the plurality of reference fine array values associated with the identified ambiguous coarse array value with the signals indicative of values of corresponding elements of the workpiece fine array, to generate a signal indicative of identification of the workpiece pattern with a particular one of the reference characters associated with the identified ambiguous value.

2. Apparatus as claimed in claim 1, including means for augmenting the set of reference characters with an unidentified workpiece pattern.

* * * * *